United States Patent [19]
Decker, Jr.

[11] 4,240,999
[45] Dec. 23, 1980

[54] METHOD FOR INTRODUCING MULTI-COMPONENT FOAM REACTANTS INTO MOLD FORM INVOLVING THE USE OF A FOAMING SPACER

[75] Inventor: Joseph A. Decker, Jr., Katy, Tex.

[73] Assignee: Igloo Corporation, Houston, Tex.

[21] Appl. No.: 28,120

[22] Filed: Apr. 9, 1979

[51] Int. Cl.³ .............................................. B29D 27/04
[52] U.S. Cl. .................................. 264/46.5; 249/107; 249/109; 264/51; 264/261; 264/328.2; 264/DIG. 83; 425/110; 425/817 R
[58] Field of Search ................ 264/46.5, DIG. 83, 51, 264/328, 261; 52/309 U; 308/218; 249/107, 109; 425/817 R, 110

[56] References Cited
U.S. PATENT DOCUMENTS

| | | | |
|---|---|---|---|
| 1,282,450 | 10/1918 | Miller | 308/218 X |
| 1,410,040 | 3/1922 | Stinson | 308/218 |
| 2,106,127 | 1/1938 | Slusser | 308/218 |
| 2,958,907 | 11/1960 | Mumford et al. | 264/46.5 X |
| 3,013,922 | 12/1961 | Fisher | 264/46.5 |
| 3,400,182 | 9/1968 | Kolt | 264/46.5 |
| 3,410,931 | 11/1968 | Johnson | 264/46.5 |
| 3,605,365 | 9/1971 | Hastings | 264/46.5 X |
| 3,694,043 | 9/1972 | Tellson | 308/218 X |
| 3,733,111 | 5/1973 | Harlan et al. | 308/218 |
| 3,813,463 | 5/1974 | Conger | 264/46.5 |
| 3,917,779 | 11/1975 | Breer et al. | 264/46.5 |
| 4,041,948 | 8/1977 | Flam et al. | 128/285 |
| 4,075,301 | 2/1978 | Oswald | 264/51 X |
| 4,135,180 | 1/1979 | White | 264/DIG. 83 |
| 4,136,916 | 1/1979 | Musselman et al. | 308/218 X |

FOREIGN PATENT DOCUMENTS

562511 12/1957 Belgium .................................. 308/218

OTHER PUBLICATIONS

Harrick, G. T. "Polyurethane" In 1976–1977 *Modern Plastics Encyclopedia*, pp. 86–96.

*Primary Examiner*—Philip Anderson
*Attorney, Agent, or Firm*—Fulbright & Jaworski

[57] ABSTRACT

A method for introducing reactants into molds and articles produced. The method involves placing a body member into a receptacle located on a turntable; aligning the body member within the receptacle; positioning a foaming spacer on the body member around an aperture in the body member; lowering a liner on a plug fixture into the body member so that the foaming spacer abuts both the body and the spaced apart liner; inserting a foam machine head into the aperture in the body; injecting suitable reactants through the head, through the spacer, into the chamber formed between the liner and the body; maintaining the contact between the head and the body for a few seconds to allow the reactants to activate and set; removing the head from the aperture of the body; and further rotating the turntable to allow the reactants time to cure. The apparatus for facilitating the introduction of reactants is the foaming spacer of the above method. The foaming spacer has a circular base ring and a circular top ring which are connected by a plurality of ribs. An opening is provided between each pair of ribs so that reactants flowing through the circular base ring, flow through the openings between the ribs, and into the chamber formed by the body and liner. Due to the force of the plug fixture and the force of the head, seals are created where the head contacts the spacer and where the spacer contacts the body.

5 Claims, 6 Drawing Figures

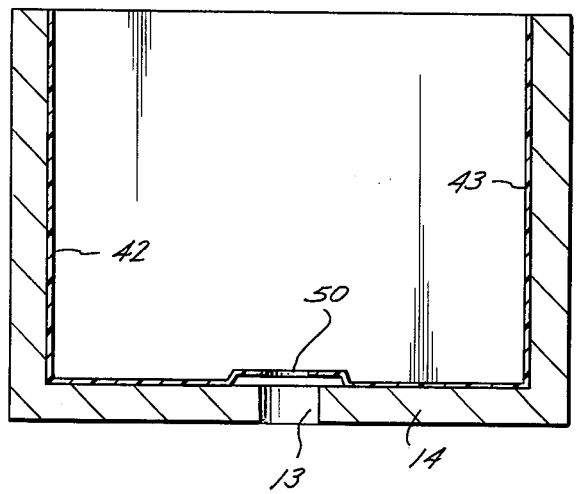
Fig. 1
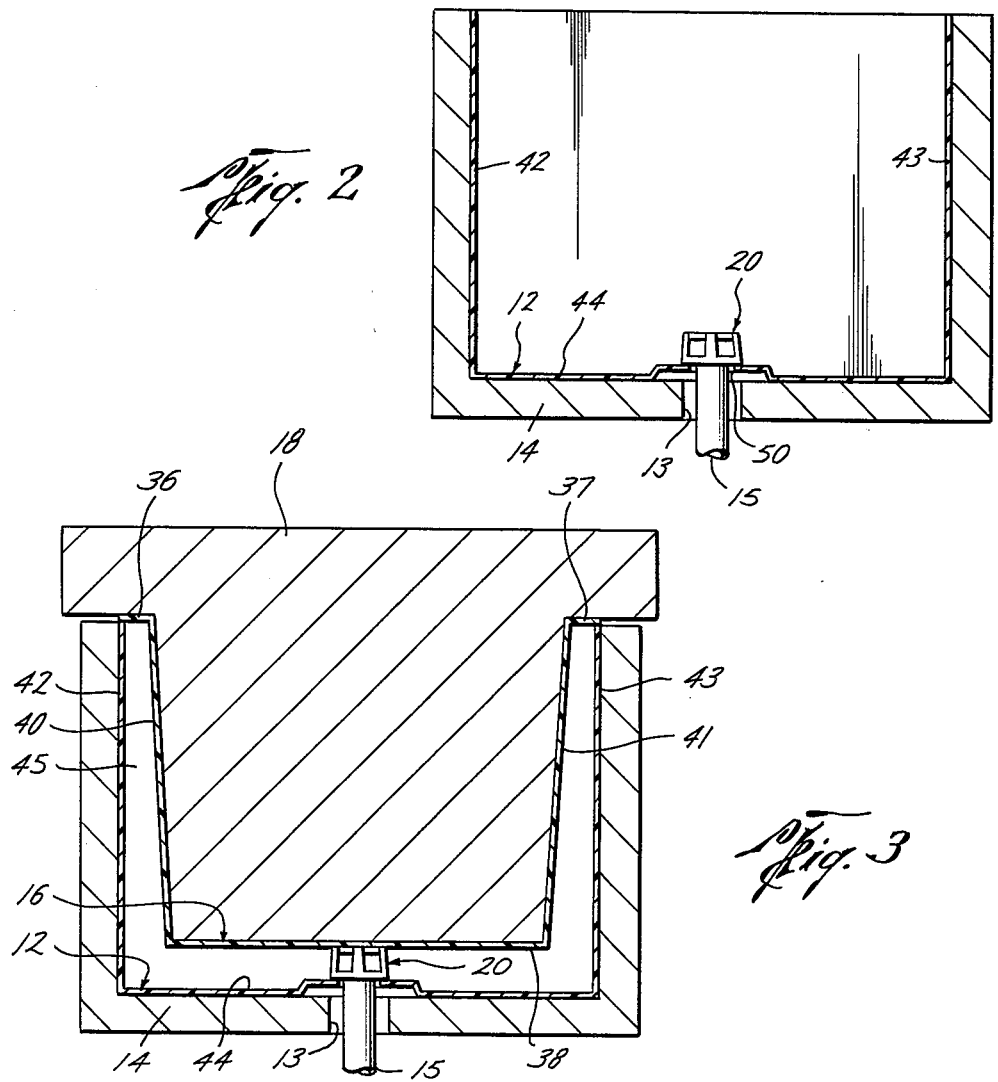
Fig. 2
Fig. 3

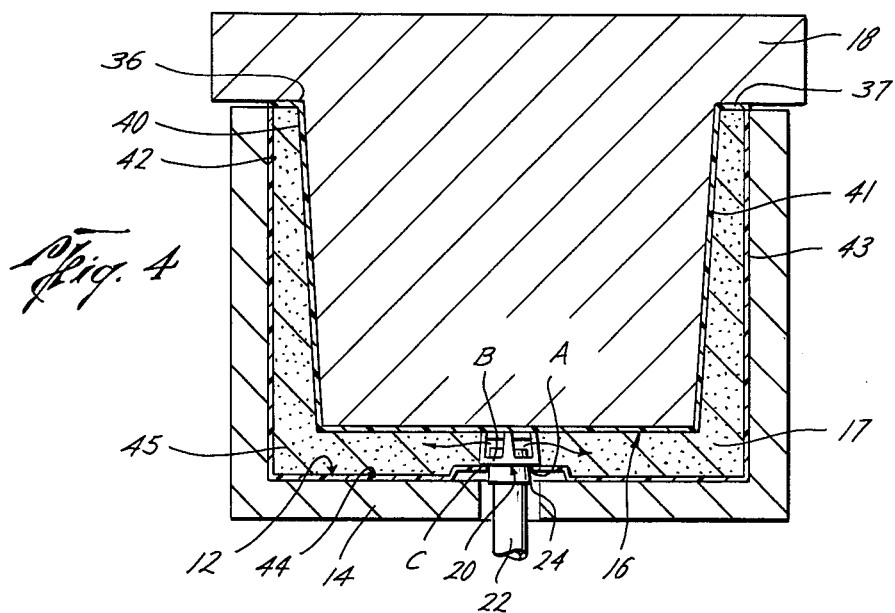
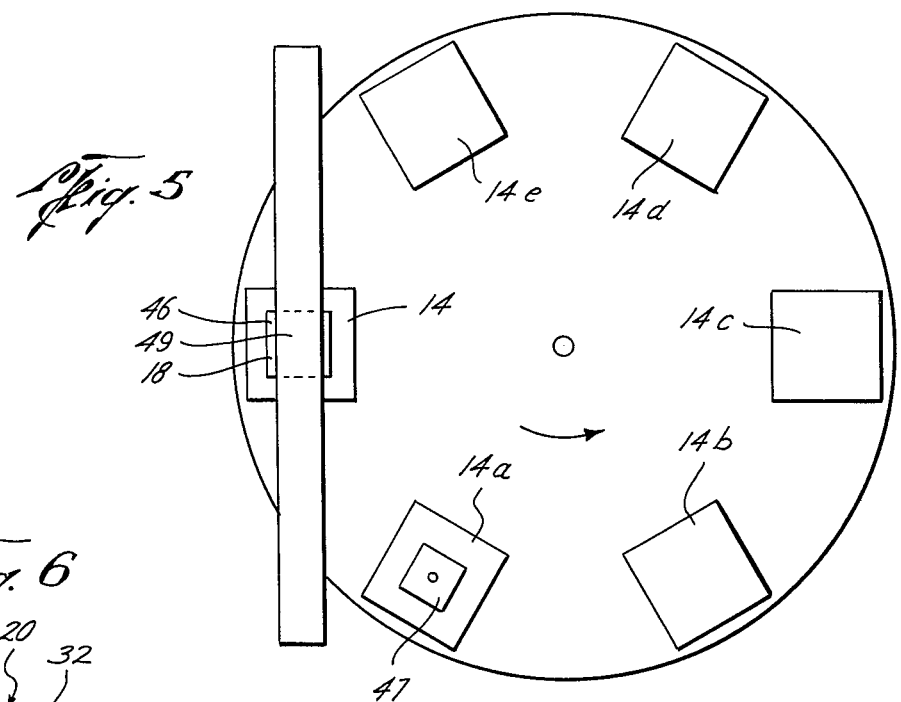
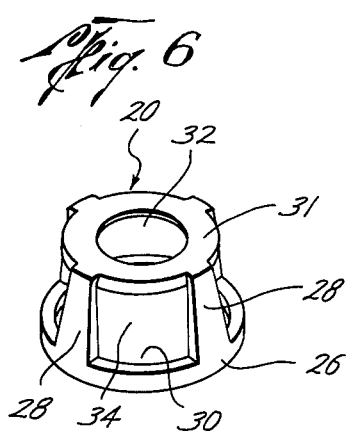

METHOD FOR INTRODUCING MULTI-COMPONENT FOAM REACTANTS INTO MOLD FORM INVOLVING THE USE OF A FOAMING SPACER

BACKGROUND OF THE INVENTION

1. Field of the Invention

The present invention relates to the field of reaction injection molding and more particularly to methods for introducing reactants into molds or combinations of components of articles to be connected together. This method can be employed advantageously with the implementation of high impingement mixing technology.

2. Description of the Prior Art

Reaction injection molding (RIM) deals with the metering of precise amounts of two or more reactants through a head. A piston in the RIM head pushes out the residues in the chamber leaving a clean chamber for another shot. The components are shot into a closed chamber or mold where they react, foam, set, and cure. In conventional low density foams in the thermal container industry, foams react in eight to ten seconds; set in 1.5 to 2.0 minutes; and cure in six to eight minutes. In prior art methods, an operator places a body member under the nozzle or head of a conventional foaming machine or moves the head to a body which is already situated in a cavity. If the body is not already in a cavity it is placed in one. A liner is then placed over the body and the fixture is closed. A conventional machine has a mixing chamber in which two streams of reactants are mixed prior to injection into the body. Following injection, any residue that remains in the mixing chamber of the foaming machine will react and foam. Such residue is usually expelled by pouring a flushing agent such as methylene chloride through the mixing chamber. During this flushing operation, various gases are released into the atmosphere, as well as those reacting on the unit body before the liner is placed on the body and fixture closed. Other problems with prior art methods include inconsistent size of reactant charges, relatively long delays while reactants set and cure, inconsistent ratio of material components, losses of foam in the residues, and poor cell structures and fills. In a typical injection process, a foam head is inserted into a mold containing components of an article, but often the head is not inserted properly and pushes the components together into undesired proximity and causes the resultant article to be deformed. Improper insertion of the head also results in the injection of an incorrect amount of foam.

SUMMARY OF THE PRESENT INVENTION

The present invention is directed to a method for introducing reactants into molds. The present invention teaches a method which efficiently and safely utilizes high impingement mixing technology (HIM). The present invention overcomes the problems of the prior art.

According to the method of the present invention at one position on a turntable, a body member having an aperture is held in place. A foaming spacer which serves to separate the body from a liner and through which reactants flow during injection is placed over the aperture. A liner is then positioned within the body member. The spacer is held tightly in place around the aperture in the body by urging the liner against the spacer, thus urging the spacer against the body. After the liner has been properly aligned with the body, the body-liner-spacer combination is indexed to a position at which a head connected to a foam machine is inserted into the aperture to sealingly engage the foaming spacer. A suitable reactant stream such as a two-part low density foam is then injected through the head, through the spacer, and into the chamber formed between the body and the liner.

An HIM machine may be used in this method. In a HIM machine the streams of reactants are mixed by impinging them upon each other at extremely high pressures in the head itself; for example, 1700 psig. The head of a HIM machine has a movable piston whose movement uncovers openings through which the reactant components of the foam enter the head when the piston moves. After the reactants have flowed through the head and impinged against each other, the piston moves again closing off the openings and pushing out of the head any residual reactant material, thereby eliminating the need to clean the head by flushing it with a flushing agent such as methylene chloride. Once the reactant stream is in place in a mold, it reacts in two to four seconds, sets in fifteen to eighteen seconds and is cured in ninety seconds, thus reducing significantly the time required to complete the operation.

According to the present invention, after the reactants have set, the head is removed and the body-liner-spacer combination is allowed to rotate on the turntable until the foam cures.

The foaming spacer of the present invention has a bottom ring which is connected to a top ring by a plurality of ribs which extend from the bottom ring to the top ring. Openings are formed between each pair of ribs through which reactants flow. Due to the configuration of the spacer, the pressure of the liner on the spacer, and the pressure of the head on the body and spacer seals are created where the head contacts the spacer and where the spacer contacts the body, thus producing a substantially "closed foaming system" in which various gaseous elements are retained within the chamber between the body and the liner. The foaming spacer acts as a guide for the head and insures that the head is inserted properly. It also maintains the desired distance between components of the article during and after the foaming operation. It is designed to remain in the article permanently so it does not have to be removed after the operation.

It is therefore an object of the present invention to provide a method for the safe and efficient introduction of reactants into a mold or article to be produced.

Yet another object of the present invention is the utilization of such an apparatus which separates one component of an article to be produced from another during a foaming procedure.

A further object of the present invention is the utilization of such an apparatus having openings therein through which the injected reactants flow.

A still further object of the present invention is the utilization of such an apparatus which requires minimal adjustment in position prior to use.

Still another object is to provide a method which will be simple and easy to perform yet which will give a high degree of control and accuracy over the foam material in the article being produced.

An additional object is to provide such method therefor which will be relatively inexpensive.

Another object of the present invention is the provision of a method which employs a high impingement mixing machine.

Another object of the present invention is the provision of a method which eliminates the need for using a machine which must be cleaned by means of a flushing agent and thereby insuring that a minimal amount of harmful gases and vapors are released into the atmosphere.

Another object of the present invention is the provision of such a method to produce a constant quantity of injected reactants.

Another object of the present invention is the provision of such a method which will reduce significantly the production of scrap or irregular articles.

Another object of the present invention is the provision of such a method in which the reactants are more thoroughly mixed so that there is less foam per unit space and better foam cell structure thereby insuring better insulation.

Another object of the present invention is the provision of seals between the body and the head; between the insert and the body; and between the insert and the head which are enhanced by the pressure of the liner on the body and the pressure of the head on the body and foaming spacer.

Other and further objects, features and advantages will be apparent from the following description of the presently preferred embodiments of the invention, given for the purpose of disclosure, when taken in conjunction with the accompanying drawings.

DESCRIPTION OF THE DRAWINGS

In the attached drawings, like character references designate like parts throughout the several views, which views are as follows:

FIG. 1 is a side elevation view illustrating in cross section the body of the article to be produced within the fixture, FIG. 2 is the view of FIG. 1 showing additionally in cross section the guide rod inserted in the fixture and the body and the foaming spacer on the guide rod, FIG. 3 is the view of FIG. 2 showing also in cross section the liner on the plug set within the fixture, FIG. 4 is a side elevation view illustrating the article to be produced in cross section with the foaming spacer and the foam head in position, FIG. 5 is a plan view of an assembly turntable, and FIG. 6 is a perspective view of the foaming spacer.

BRIEF DESCRIPTION OF THE PREFERRED EMBODIMENTS

For purposes of disclosure, the present invention will be described as applied in the production of a thermal container. Although this is one application of this invention, it is to be understood that the invention claimed herein may be used in other applications where it is necessary to introduce reactants into a mold or into an article to be produced. Also, the disclosed embodiment will employ HIM technology, but it is to be understood that the method may be used with other injection molding technology.

Referring now to FIG. 1, the body 12 having aperture 50 and sides 42 and 43 rests in fixture 14 having opening 13. The fixture 14 conforms substantially to the shape of the body 12. In FIG. 2, the guide rod 15 has been inserted through the aperture 50 and the opening 13. The foaming spacer 20 has been positioned over the aperture 50 by placing the foaming spacer 20 on the guide rod 15.

The foaming spacer 20, as shown in FIG. 6, has formed integrally thereof the base ring 26 which is connected with the top ring 31 by a plurality of ribs 28. Reactants are permitted to flow freely through the foaming spacer 20 by means of a series of openings. The base ring 26 is provided with an opening 30; the top ring 31 is provided with the opening 32, and the openings 34 are provided between each pair of the plurality of ribs 28. The dimensions of the foaming spacer 20 can be predetermined depending on the specific article to be produced; for example, the longitudinal dimension of the foaming spacer 20 can be predetermined for a particular separation between the liner 16 and the body 12.

The liner 16, FIGS. 3 and 4, has bottom 38, sides 40 and 41 extending upwardly from bottom 38, and shoulders 36 and 37. The body 12 has base 44 and sides 42 and 43 extending upwardly therefrom. The shoulder 36 of liner 16 extends from side 40 of liner 16 and abuts side 42 of body 12. As shown in FIG. 3, the liner 16 on the plug 18 is lowered into position within the body 12. The pressure transmitted by plug 18 to shoulder 36 creates a seal at the point where shoulder 36 abuts side 42. Similarly, the shoulder 37 of liner 16 abuts side 43 of body 12 and, due to the pressure exerted by plug 18 on shoulder 37, a seal is created at the point at which shoulder 37 abuts side 43.

As shown in FIG. 4, the guide rod 15 has been removed and the HIM foam head 22 has been inserted through the opening 13 and the aperture 11 into the foaming spacer 20 through opening 30 of the base ring 26.

The HIM head 22 with the adapter 24 is forcefully inserted into the opening 30 of base ring 26 and, due to the force transmitted by the plug 18 to the liner 16 and the foaming spacer 20 and the upward force of the HIM head 22, a number of seals are created. A seal may be created at point A between the body 12 and the adapter 24 of HIM head 22. Another seal is created at point B between the foaming spacer 20 and the sleeve adapter 24 of HIM head 22. A third seal is created at point C between the foaming spacer 20 and the body 12. These seals insure that neither reactants nor resulting gases will leak when the reactants are injected into the chamber 45 created between the liner 16 and the body 12.

FIG. 5 illustrates the turntable 48 which carries the fixture 14 to a plurality of stations. A plurality of fixtures 14a–14e are also located on the turntable 48. At the load station 46, the plug 18 is raised by the lifting mechanism 49 and the body 12 (as shown in FIG. 3) is set into place within the fixture 14 which is in position on the table 48 as in FIG. 1. The foaming spacer 20 of proper dimensions is then placed over the guide rod 15 as shown in FIG. 2. The liner 16 is then placed on the plug 18 and lowered into position in contact with the foaming spacer 20 and in contact with the sides 42 and 43 of the body 12 as shown in FIG. 3. The plug 18 is forced down to urge the liner 16 into contact with the foaming spacer 20 and with the sides 42 and 43 of the body 12. The table 48 then indexes the body 12-liner 16-foaming spacer 20 combination into position at the HIM head station 47. The HIM head 22 is then inserted through the opening 13 of fixture 14, through the aperture 50 of the body 12, and through the opening 30 of base ring 26 of foaming spacer 20. The HIM head 22 is then fired, as illustrated in FIG. 4, injecting a stream of reactants 17 through the foaming spacer 20 into the chamber 45. The HIM foam reactants 17 can react, for example, in two to four seconds and set in fifteen to eighteen seconds, the set time depending on the quantity of foam. The component combination is held in position at the HIM head station 47 with the HIM head 22 still inserted long enough to allow the foam to set. The HIM head 22 is then lowered and the assembly is then allowed to rotate with the turntable 48 until the reactants have cured.

In conclusion, therefore, it is seen that the present invention and the embodiment disclosed herein are well adapted to carry out the objectives and obtain the end sets forth at the outset. Certain changes can be obviously made in the method and apparatus without departing from the spirit and scope of this invention. Accordingly, an invention in the introduction of reactants has been disclosed which provides methods and means by which the introduction of reactants into molds or articles to be produced can be closely controlled and adjusted. The present invention also teaches a method which is significantly safer than prior art methods and which can advantageously implement high impingement mixing technology. The present invention is, therefore, well adapted to carry out the objects and obtain the ends and advantages mentioned as well as other inherent therein.

What is claimed is:

1. A method for introducing foam into a mold having an aperture in its bottom and having walls enclosing a space within the mold, the method comprising the steps of placing the mold on a turntable,
   positioning a foaming spacer having a plurality of openings therethrough within the mold so that one opening of the foaming spacer overlies the aperture of the mold and so that the foaming spacer maintains the separation between the walls of the mold,
   rotating the turntable so that the mold with the foaming spacer in place is in position to receive a foam head of a foaming machine,
   inserting the foam head forcefully through the aperture of the mold and into the foaming spacer, so that the foam head is held in sealing contact with the foaming spacer,
   injecting foam through the head and through the openings of the foaming spacer into the space within the mold,
   maintaining the head in position in the foaming spacer long enough for the foam to activate and set,
   removing the head from the foaming spacer and from the aperture of the mold, and
   rotating the turntable and leaving the mold containing the foam on the turntable while it rotates long enough for the foam to cure.

2. The method of claim 1 wherein the foaming spacer comprises
   a base ring having an opening therethrough, suitable for receiving the foam head,
   a plurality of spaced apart ribs connected to and extending upward from the base ring, each rib having a top,
   a top ring parallel to the base ring and connected at intervals to the top of each rib, and
   wherein the foaming spacer is positioned with the opening of the base ring overlying the aperture of the mold, the base ring contacting a wall of the mold and the top ring contacting an opposing wall of the mold thereby maintaining the separation between the walls,
   wherein the foam head is inserted through the aperture of the mold into the opening in the base ring, and
   wherein the injected foam flows through the openings formed between the spaced apart ribs of the foaming spacer into the mold.

3. The method of claim 1 wherein components comprising the foam are made to impinge upon each other under high pressure within the head of the foaming machine prior to injection of the foam into the mold.

4. The method of claim 2 wherein
   the foam head is inserted with pressure which holds it in sealing contact with the interior of the base ring of the foaming spacer thereby preventing leakage of foam between the foam head and the foaming spacer and
   including the further step of applying pressure on the wall of the mold opposite the wall having the aperture, this pressure forcing the base ring of the foaming spacer against the interior of the wall of the mold having the aperture thereby creating a seal that prevents leakage of foam between that wall of the mold and the foaming spacer.

5. A method for introducing components of a foam into the space enclosed by a body having an aperture in its bottom and a liner positioned within the body member, the method including the steps of
   placing the body inside of one of several fixtures on a rotating turntable, the fixtures conforming to the shape of the body and having an opening therein for alignment,
   inserting a guide rod through the aperture in the body and through the opening in the fixture to align the body in the fixture
   positioning a foaming spacer around the guide rod so that the foaming spacer is substantially centered around the aperture of the body,
   placing a liner on a plug fixture which is movably secured above the turntable,
   lowering the liner on the plug fixture into the body so that the liner contacts the foaming spacer and the liner and body are maintained and spaced apart in relationship to one another,
   applying pressure to the plug fixture to urge the liner into sealing contact with the body,
   removing the guide rod,
   rotating the body liner assembly to a position adjacent a foam injection head,
   inserting the head into the aperture in the body and into the foaming spacer so that a seal results between the head and the foaming spacer and between the foaming spacer and the body,
   injecting a multi-component foam through the head under pressure so that the foam flows through the spacer into the space enclosed by the body and the liner,
   maintaining the head in the foaming spacer long enough for the foam to activate and set,
   removing the head from the foaming spacer and the body,
   rotating the resulting article further on the turntable long enough for the foam to cure.

* * * * *